March 22, 1960     T. R. ISBISTER     2,929,116
WEATHER STRIP HAVING LOCKING ASSEMBLY
Filed April 3, 1958
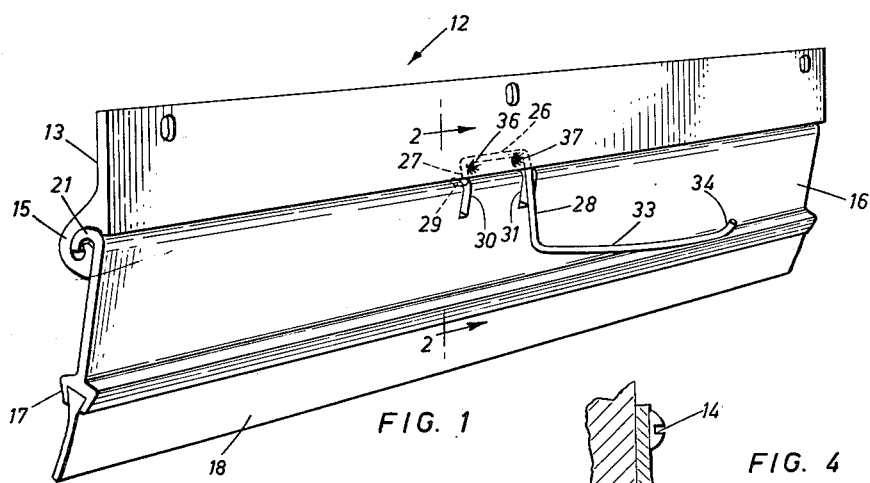
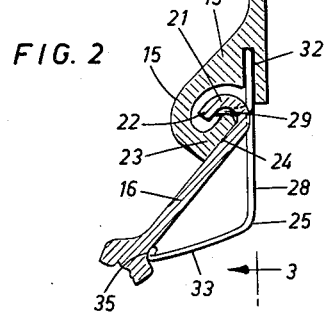
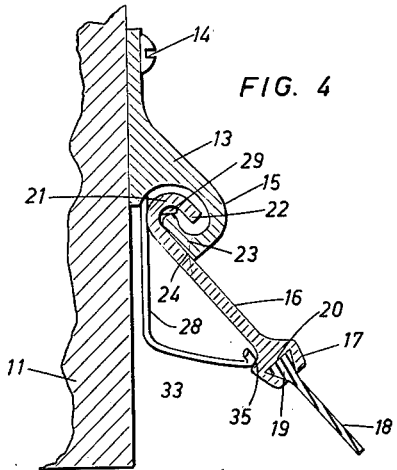
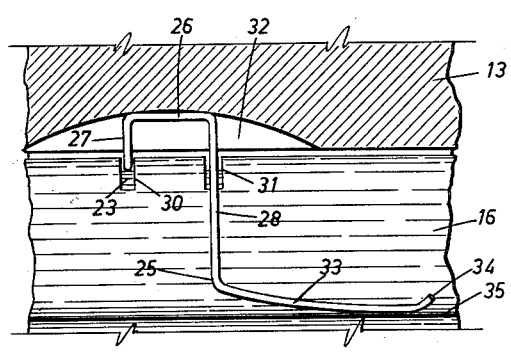
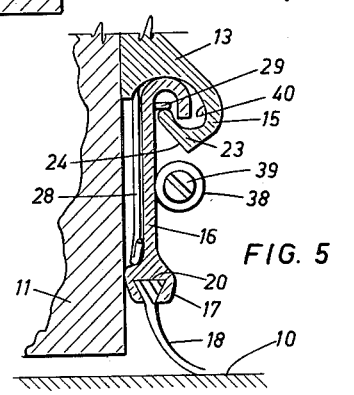
Inventor
THOMAS R. ISBISTER

United States Patent Office 2,929,116
Patented Mar. 22, 1960

2,929,116

WEATHER STRIP HAVING LOCKING ASSEMBLY

Thomas R. Isbister, Toronto, Ontario, Canada

Application April 3, 1958, Serial No. 726,202

2 Claims. (Cl. 20—67)

This invention relates to a weather strip for doors.

This case, in part, discloses and claims subject matter disclosed but not claimed in my earlier application, Serial No. 579,576, filed April 20, 1956, which has matured into Patent No. 2,855,638, issued October 14, 1958.

Former door weather strips of the hinge type are provided in the form of a conventional mechanical hinge carrying an elastomer sealing strip or in the form of an elastomer strip which itself is wholly swingable to and from a seating position. A mechanical hinge of conventional form having a central shaft freezes readily, particularly at sub-zero temperatures, and is therefore rendered inoperative and impractical for use in many localities. Where the device depends upon the elastic nature of the sealing strip to yield in a hinge like function, the material of the sealing body presents lesser qualities of elastic recovery, i.e., lesser springiness as temperatures drop below freezing. While such lesser elastic recovery does not critically affect the sealing qualities of the sealing age of such a strip the flexibility of the body thereof suffers to such a degree as to render such devices impractical for use at sub-zero temperatures. Moreover the flexibility of such devices suffers greatly from normal weathering.

It is therefore an object of the invention to provide a sealing strip for doors adapted in particular for sub-zero service and effectively operative in a wide range of weather conditions.

It is another object of the invention to provide a weather strip for doors having a novel fulcrum or hinge-like construction with a locking means permitting ready assembly and retention of the parts, the weather strip being serviceable under a variety of weather conditions and being substantially self enclosed.

It is a further object of the invention to provide a weather strip for a door threshold which is adapted to be provided in cheap but sturdy construction and which embodies an easily replaceable sealing element.

Other objects of the invention will be appreciated by a study of the following specification taken in conjunction with the accompanying drawings in which:

Figure 1 is a perspective rear view of a weather strip of the invention;

Figure 2 is a sectional view of the central portion of the weather strip along the lines 3—3 of Figure 2;

Figure 3 is an enlarged sectional view of the locking means 25 shown in Fig. 1 illustrating how it cooperates with members 13 and 16.

Figure 4 is a cross-sectional view of the weather strip mounted on a door showing the normally free outwardly biased position thereof; and Figure 5 is a similar sectional view of the weather strip with the door in the closed position illustrating the closed position of the components of the weather strip.

In the drawings, the threshold 10 having a door 11 (shown in part) hinged thereover, is adapted to be sealed by a sealing strip device 12 of the invention. The device 12 comprises the extruded rigid body or bracket 13 fastened by suitable screws 14 to the door 11 and having an inturned enclosed lip 15 of predetermined radius as hereinafter described in more detail. The sealing arm 16 is likewise of extruded form and carries at the free end 17, a rubber or other elastomer sealing member 18 having an enlarged bead or locking flange 19 therein adapted to be gripped within the socket portion 20 of the arm. The fulcrum end 21 of the arm 16 is defined by a forwardly curved flange or lip 22 adapted to seat within the lip 15. The exterior of lip 15 is provided with the shoulder 23 having an abutment surface 24.

The co-operating lips of the body and swingable arm are brought into assembly by longitudinal insertion. By reason of the geometry of the structure, the outwardly curved flange 22 defining the lip 21 of the arm 16 cannot be hooked into assembly with the depending lip 15 of the body 13. Accordingly, once assembled, the arm and body components cannot be separated by way of hinging action but must be separated by sliding one out of the other by way of longitudinal motion. Therefore, the hinge or fulcrum construction effected is essentially self retaining but is nevertheless relatively free within the limits of motion indicated in Figures 4 and 5.

In Figure 1 the biasing and locking means 25 is shown in the form of a wire spring. The wire spring is provided with a generally U-shaped portion having a base 26, short leg 27, and long leg 28. Short leg 27 is provided with a short forwardly extending locking leg 29 extending substantially at right angles to short leg 27.

In order to accommodate the locking portion of the locking and biasing means 25 sealing arm 16 is provided at its upper edge with slots 30 and 31.

Slots 30 and 31 extend at right angles to the length of arm 16 and are of a depth equal to the depth of the forwardly curved lip 22. Bracket 13 is provided with longitudinal retaining groove 32 adapted to receive the base portion 26 of the wire spring means when the device is in the assembled position.

Long leg 28 of the biasing and locking means 25 is provided with a forwardly angled arm extension 33 having a reversed end 34.

The assembly and operation of spring biasing and locking means 25 is as follows:

The arm 16 and bracket 13 are assembled in operative relation by longitudinal insertion. Assuming the arm 16 to be in a horizontal position with free end 17 facing towards operator means 25 then may be inserted by inserting locking leg 29 in slot 30, with base portion 26 extending towards the end 17. Means 25 is then rotated upwardly away from arm 16 through substantially 90° until base 26 is parallel with the back of bracket 13. Means 25 is then rotated through 90° to bring base 26 into groove 32 and leg 28 into correspondence with slot 31. Arm 33 is then sprung upwardly and end 34 thereof snapped over and engaged with shoulder 35 on free end 17. In order to further secure the biasing and locking means 25 the back of bracket 12 behind groove 32 may be indented at points 36 and 37 as shown in Figure 1. This will retain means 25 firmly within slot 32 and maintain the device in an assembled position.

The forward inclination of spring arm 33 urges sealing arm 16 to its forward or outer position as shown in Figure 4 determined by engagement of sealing arm 16 with abutment surface 24. The sealing arm 16 is swung to the substantially vertical or closed position as the door is brought to the position of closure by engagement with stud 38 fastened by screw 39 to the door jambs (not shown).

Figure 5 illustrates the upward limiting position of sealing arm 16 permitted by the fulcrum arrangement described. It will be noted that the lip 22 is sufficiently long in this position to remain within channel 40. It will be realized therefore, that in the closed position, some vertical movement may be possible in the fulcrum construction of the invention while the assembly of the components is still maintained. Accordingly, an attempt to force the door shut with a small obstruction under the sealing member 18 will not result in damage to the components by reason of the limited amount of freedom or "play" provided in the fulcrum structure.

In order to accomplish the fulcrum hinge construction described, the inner surface radius of the bracket lip should be substantially equal to the inner surface radius of the arm fulcrum lip. While the thickness of the bracket lip may be slightly greater than the thickness of the fulcrum lip of the arm, both lip thicknesses are substantially equal to the inner surface radii. Each of the lip formations has a curvature defining a hook-like configuration in cross-section extending through more than 180° of arc. In a general sense, the structure comprises extruded components defining in section, co-operating interconnected hook-like portions adapted to permit swinging motion relatively between the components wherein said motion is limited on the one hand by the degree to which one hook formation may be nested, that is, rotated into the other; and on the other hand by abutment means adapted after a predetermined arc of movement, to engage the outer surfaces of the opposing hook-like formation.

It has been found that the weather strip device of the invention may be provided economically in extruded form. The components are assembled longitudinally after extrusion. The sealing means is mounted in the sealing arm by longitudinally sliding the extruded elastomer sealing member or element into the gripping channel or socket portion 20 on the free end of the sealing arm. The ends of the sealing arm may be crimped to lock the sealing member therein.

It has been found that in the past, a conventional hinge type of construction is apt to jam or freeze under sleeting and icing conditions, rendering such prior devices relatively ineffective. In cases where a direct hinge construction has been avoided and a simple elastic body employed to form, by reason of its deformable nature, a sort of hinge, weathering has destroyed the resilient effect of the material used for such member and has rendered it ineffective in a relatively short time.

By way of contrast, the construction of the invention does not provide a tight hinge construction and permits freedom in the fulcrum area adapted for free swinging action under icing conditions. Moreover, the inturned lip of the bracket effectively serves as an effectively self-enclosing weather protecting mantle whereby the fulcrum construction may be defined as of the enclosed type protected from driving rain, sleet and the like. The fulcrum construction also is not affected by weathering and may therefore serve for continued use over a substantial period of time. The elastomer sealing element may be replaced readily and may be provided in an extruded, inexpensive form.

The biasing and locking means provides a simple and inexpensive way of maintaining the parts of the device in their operative relationship and does away with the necessity for end stops or similar devices while at the same time allowing a freedom of movement in the fulcrum construction.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What I claim as my invention is:

1. A weather strip to provide a seal between a door and a threshold when the door is in the closed position against a door jamb and comprising in combination: a bracket having a depending internal lip portion said bracket being fastened to a door adjacent and substantially parallel to the threshold edge thereof; a swingable arm having an upwardly and forwardly formed lip portion at one end, said lip being longitudinally engageable in fulcrum relationship within the depending lip portion of said bracket; an elastomer member mounted on said arm; a retaining groove disposed longitudinally in said bracket; two slots in said swingable arm, said slots being at right angles to said groove and extending through and of a depth equal to said lip portion of said arm, said slots being disposed opposite said groove when said bracket and said arm are in assembled fulcrum relationship; spring biasing and locking means; said spring biasing and locking means having a base portion said base portion being within said retaining groove; slot engaging leg portions depending from said base portion; and forwardly and downwardly extending spring means depending from one of said slot engaging leg portions, said forwardly and downwardly extending spring means engaging said arm to bias said arm normally outwardly and upwardly with respect to the threshold edge of the door supporting said bracket.

2. A weather strip to provide a seal between a door and a threshold when the door is in the closed position against a door jamb and comprising in combination: a bracket having a depending internal lip portion said bracket being fastened to a door adjacent and substantially parallel to the threshold edge thereof; a swingable arm having an upwardly and forwardly formed lip portion at one end, said lip being longitudinally engageable in fulcrum relationship within the depending lip portion of said bracket; an elastomer member mounted on said arm; a retaining groove disposed longitudinally in said bracket; two slots in said swingable arm, said slots being at right angles to said groove and extending through and of a depth equal to said lip portion of said arm, said slots being disposed opposite said groove when said bracket and said arm are in assembled fulcrum relationship; spring biasing and locking means; said spring biasing and locking means having a base portion, said base portion being within said retaining groove; a first slot engaging leg portion depending downwardly from said base portion; a locking lug extending forwardly therefrom and riding within one of said slots in longitudinal locking engagement when said bracket and said arm are in assembled fulcrum relationship; a second slot engaging leg portion depending downwardly from said base portion engaging the other of said two slots; and forwardly and downwardly extending spring means depending from said second slot engaging leg portion, said forwardly and downwardly depending spring means engaging said arm to bias said arm normally outwardly and upwardly with respect to the threshold edge of the door supporting said bracket.

References Cited in the file of this patent

UNITED STATES PATENTS

| | | |
|---|---|---|
| 105,232 | Miller | July 12, 1870 |
| 437,478 | Capewell et al. | Sept. 30, 1890 |
| 733,295 | Stites | July 7, 1903 |
| 2,855,638 | Isbister | Oct. 14, 1958 |